United States Patent [19]

Fourrey

[11] Patent Number: 4,938,529
[45] Date of Patent: Jul. 3, 1990

[54] DEVICE FOR TURNING OUT A LATERAL WING OF A SEAT AND BUCKET SEAT FOR AN AUTOMOBILE VEHICLE OR THE LIKE INCLUDING SAID DEVICES

[75] Inventor: Francois Fourrey, Montbeliard, France

[73] Assignee: ECIA - Equipements Et Composants Pour L'Industrie Automobile, Audincourt, France

[21] Appl. No.: 275,484

[22] Filed: Nov. 23, 1988

[30] Foreign Application Priority Data

Nov. 26, 1987 [FR] France ............................. 87 16419

[51] Int. Cl.⁵ ............................................. A47C 3/00
[52] U.S. Cl. .................................................. 297/284
[58] Field of Search ...................... 297/284, 460, 459

[56] References Cited

U.S. PATENT DOCUMENTS

| | | | |
|---|---|---|---|
| 4,452,485 | 6/1984 | Schuster | 297/460 |
| 4,500,136 | 2/1985 | Murphy et al. | 297/284 |
| 4,537,444 | 8/1985 | Maruyama et al. | 297/284 |
| 4,636,000 | 1/1987 | Nishino | 297/284 |
| 4,673,212 | 6/1987 | Mayer | 297/284 |
| 4,804,221 | 2/1989 | Saiki | 297/284 |

FOREIGN PATENT DOCUMENTS

| | | | |
|---|---|---|---|
| 2721559 | 1/1978 | Fed. Rep. of Germany | 297/284 |
| 0229831 | 11/1985 | Japan | 297/284 |

*Primary Examiner*—Peter A. Aschenbrenner
*Attorney, Agent, or Firm*—Sughrue, Mion, Zinn, Macpeak & Seas

[57] ABSTRACT

The seat cushion and/or the backrest of the seat comprising an elastic layer (4) carried by a frame and provided with two lateral projecting wings (8) in which an inverted U-shaped driving rod (14) is connected to the upper part of one of the wings and is pivotally mounted relative to the frame (2). This rod is extended at one of its ends by a connecting lever bent around the frame element and connected to a control cable controlling its pivoting fixed to the door (38) of the vehicle. In this way, this door exerts a pull on the cable which causes the rod (14) to pivot and thereby turns the wing (8) outwardly and clears the access to the seat.

12 Claims, 7 Drawing Sheets

DEVICE FOR TURNING OUT A LATERAL WING OF A SEAT AND BUCKET SEAT FOR AN AUTOMOBILE VEHICLE OR THE LIKE INCLUDING SAID DEVICES

BACKGROUND OF THE INVENTION

Bucket sears are increasingly appreciated by users of automobile vehicles for the great comfort they afford. Now, it is well known that this comfort is all the greater when the wings of the seat and/or of the backrest are more raised and thus more effectively maintain the body in the suitable position.

It is also unfortunately well known that the highly raised wings constitute an appreciable hindrance when it is desired, to sit on or extract oneself from a bucket seat.

SUMMARY OF THE INVENTION

An object of the present invention is to overcome this drawback by permitting temporarily turning out or down the wing of a bucket seat and thereby render it more practical and pleasant to use.

The invention therefore provides a device for turning out the lateral wing of a bucket seat for an automobile vehicle or the like comprising an elastic layer provided with two projecting lateral wings and carried by a frame, which includes a driving rod bent in the form of an inverted U whose base is hooked to the upper part of the wing to be turned out of the elastic sheet while its ends are pivotally mounted on the frame, a n d e x t e n d e d, at one of its ends, by a lever connecting it to a device controlling its movement between an upper normal position of use of the seat and a position in which the wing is turned out.

Access to the seat may in this way be completely cleared at any time irrespective of the shape of the wings of the seat and/or backrest, which permits giving the wings a height providing optimum comfort.

The control device may be actuated manually or automatically, it being for example controlled by the movement of the door of the vehicle. It may for example be formed by a cable secured at one end to the connecting lever and at its opposite end to the door of the vehicle so that the movement of the latter automatically causes the turning out of the wing and the clearance of the access to the seats.

The control device may also be formed by a lever pivotally mounted on the frame and connected to a link pivotally mounted on the connecting lever and passing from one side to the other of the frame element.

Such a turning out device may be mounted on either one of the wings of the elastic layer of the seat or backrest and even on each of these wings.

The invention also relates to a vehicle seat comprising said device and in particular a double seat comprising two side-by-side backrest elastic layers and wing-turning out devices on the two adjacent lateral wings of said layers, the control levers of these devices being pivotally mounted in proximity to the seat cushion and incorporated in an armrest, which enables them to be controlled simultaneously for converting the double seat into a bench seat.

The following description of embodiments, given by way of non-limitative examples and shown in the accompanying drawings, will bring out the advantages and features of the invention.

DETAILED DESCRIPTION OF PREFERRED EMBODIMENTS

Figure 1:
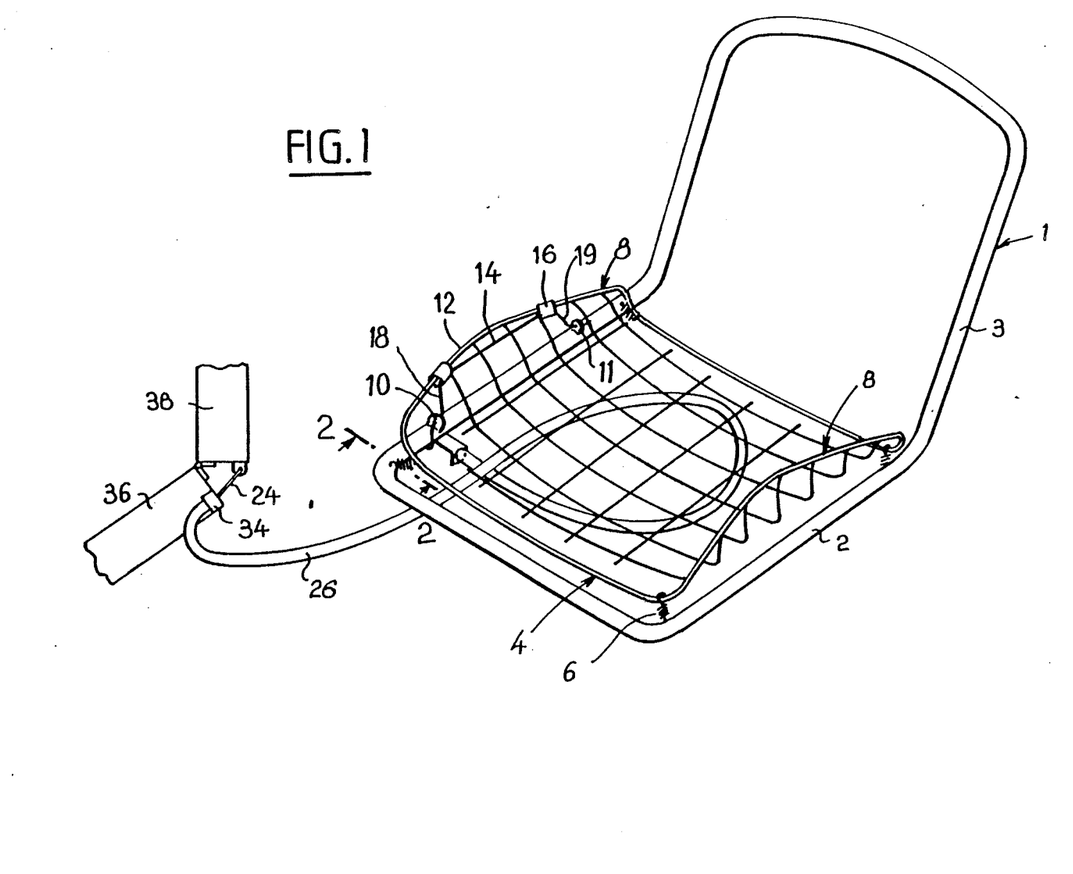
FIG. 1 is a diagrammatic perspective view of a bucket seat comprising a wing-turning out device according to the invention.

The bucket seat diagrammatically shown in FIG. 1 comprises a frame 1 which is formed in the presently-described embodiment by a tubular member but which may of course have any other form. The frame member 1 is bent in such manner as to constitute a seat cushion frame 2 and a backrest frame 3 which are interconnected. Mounted on the seat cushion frame 2 is an elastic layer 4 which is connected to the frame by springs 6 located for example in each of the corners of the frame 2.

The elastic layer 4 is raised on the two opposite lateral sides of the seat so as to form two wings 8 projecting from the frame 2.

Figure 2:
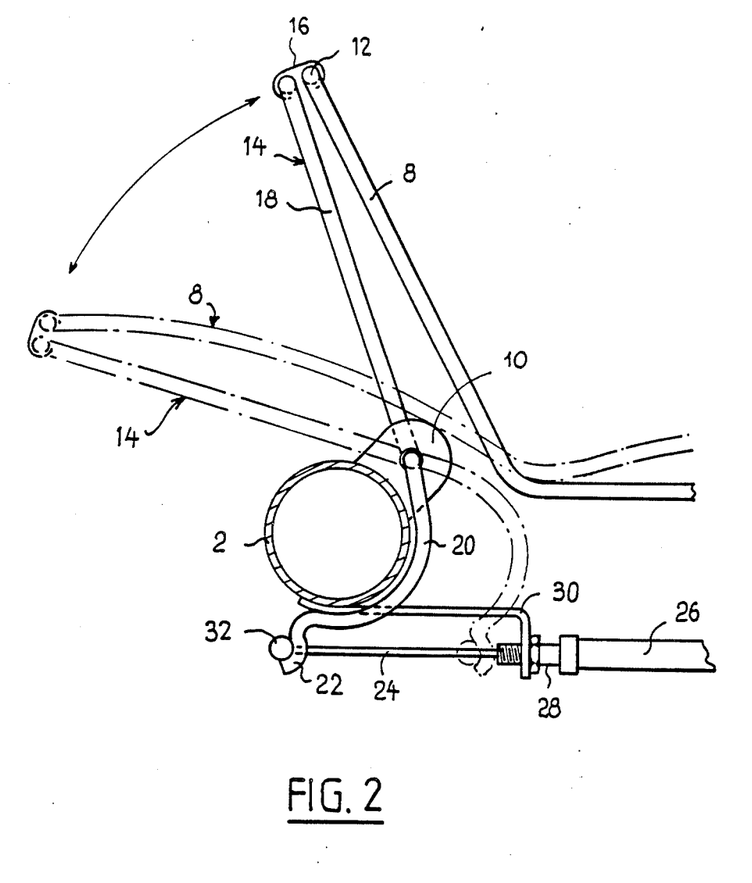
FIG. 2 is a sectional view taken on line 2—2 of FIG. 1 of a detail to an enlarged scale.

On at least one of its sides, the seat cushion frame 2 has two tabs, respectively 10 and 11, in which is pivotally mounted the lower part of a driving element 14 whose upper part is connected to the upper wire 12 of the lateral wing 8 of the elastic layer. The driving element is preferably constituted, as shown in the drawings, by a rod 14 which is bent into the shape of an inverted U and is connected to the wire 12 of the wing of the layer by clips or fasteners 16. The ends of the lateral branches 18 and 19 of the U-shaped rod 14 are pivotally mounted in the tabs 10 and 11 respectively, but the branch 18 located in the front part of the seat in the embodiment shown in FIGS. 1 and 2, is extended by a connecting lever 20 connected to a control device. Preferably, the lever 20 is so bent as to extend around the frame element 2 and to substantially radially move away from the latter so as to constitute a foot 22 for hooking to the control device.

In the embodiment shown in FIGS. 1 and 2, the control device is formed by a cable 24 mounted within a flexible sheath 26 which is fixed, for example by a cable tensioning means 28, to a bracket 30 carried by the frame element 2. In this case, the foot 22 preferably has a concavity on the side thereof remote from the bracket 30 for receiving a pin 32 fixed to the end of the cable 24, which extends through this foot 22. The opposite end of the flexible sheath 26 is fixed at a suitable point of the vehicle to permit an easy control of the translation of the cable 24, i.e. of the position of the lever 20 and the whole of the rod 14.

This end 34 is for example fixed to the body of the vehicle on the post 36 of the door 38, the cable 24 being secured to the door 38 itself (FIG. 1). Consequently, the opening of the door 38 automatically exerts a pull on the cable 24 which drives the foot 22 inwardly of the seat and consequently pivots the lever 20 and the rod 40 relative to the tab 10 and to the tab 11 (FIG. 2). The pivoting of the lever 20 therefore automatically pivots the rod 14 from the upright position shown in full line in FIG. 2 to the turned out position shown in dot-dash line in this Figure. The wing 8 pivots of course at the same time as the rod 14 since their upper ends are interconnected by the fasteners 16, so that this wing is turned outwardly over the frame 2 and clears the access to the seat, the elastic frame 4 being temporarily deformed as shown by the dot-dash line in FIG. 2. As soon as the door 38 is closed, the cable 24 returns the foot 22, and consequently the lever 20, against the tube of the frame 2 while the rod 14 is moved upwardly and the wing 8 of the elastic layer 4 resumes its normal (undeformed) raised position of use on the seat.

Figure 3:
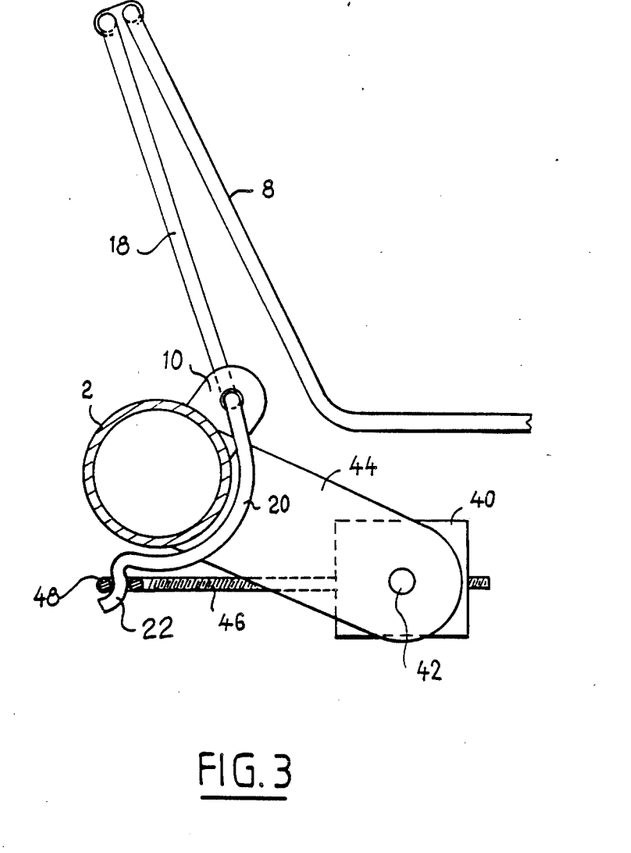
FIG. 3 is a view similar to FIG. 2 of a variant.

The tilting of the wing 8 may also be controlled as shown in FIG. 3 by means of a motor-speed reducer unit 40 pivotally mounted on a pin 42 carried by a fixing bracket 44 connected to the frame tube 2. The motor-speed reducer unit 40 drives a screw-threaded rod 46 which terminates in a hook 48 fitted on the curved foot 22 of the lever 20. This motor-speed reducer unit 40 is preferably controlled, through a control logic (not shown), by a closing switch placed in an easily accessible place for the user of the seat or, preferably, disposed in the fillister of the door and actuated by the opening and closing of the latter.

Figure 4:
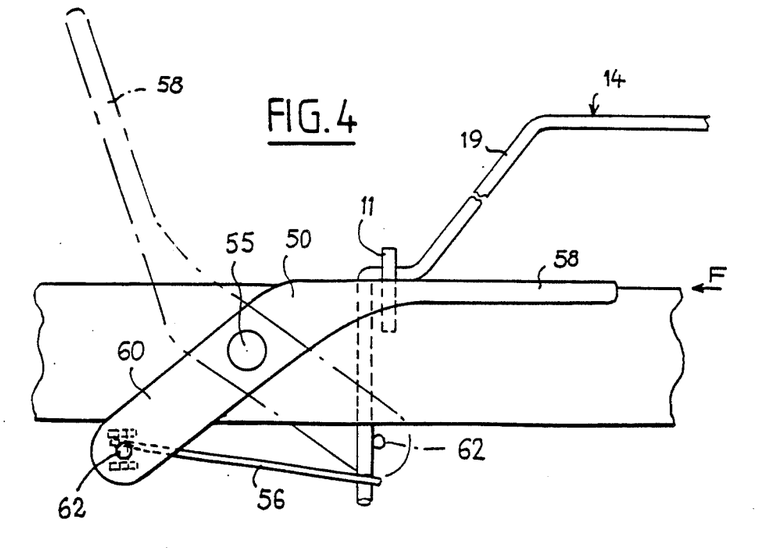
FIG. 4 is a side elevational view of a control device according to another embodiment mounted at the rear of the seat.
Figure 5:
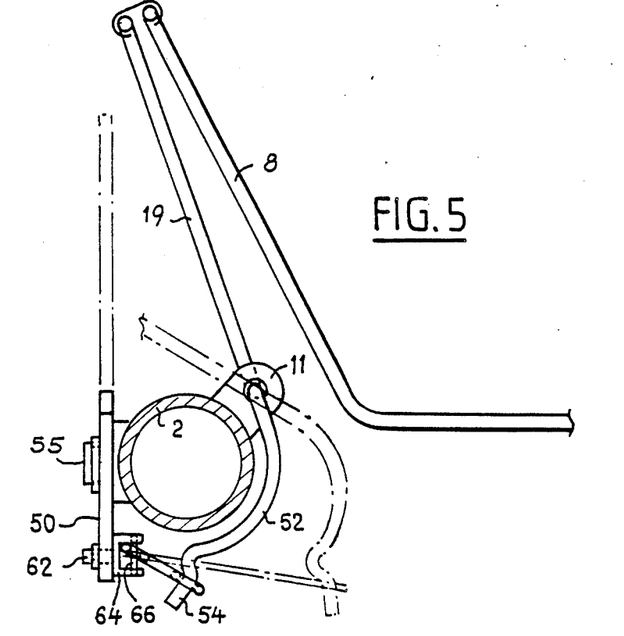
FIG. 5 is a view in the direction of arrow F of FIG. 4.

In another embodiment shown in FIGS. 4 and 5, the wing is tilted manually by means of an actuating lever 50 pivotally mounted on the frame 2, preferably in the vicinity of the rear of the latter. It is then the branch 19 of the driving rod 14 which is extended so as to form a connecting lever 52 which is bent around the frame tube 2. This lever 52 terminates in a radial foot 54 which is substantially rectilinear and connected by a link 56 extending under the frame 2, to the actuating lever 50. The latter has on each side of its pivot pin 55 mounting it on the frame 2, an actuating arm 58 extending toward the front of the seat and an arm 60 carrying the link 56 and extending downwardly. Extending through the arm 60 in the vicinity of its lower end, is a pin 62 carrying a yoke 64 through which extends a pin 66 on which is pivotally mounted the end of the link 56 which extends forwardly and inwardly of the seat and is connected to the lever 52.

In the normal position of use of the seat, the shifting arm 58 is substantially parallel to the tube 2 of the frame, as shown in FIG. 2. To tilt or turn out the wing 8, it is therefore sufficient to shift this arm 58 upwardly and cause the downward pivoting of the arm 60 and consequently of the yoke 64, and urge the link 56 inwardly of the seat. It then pivots the lever 52, and consequently the rod 14 relative to the tabs 10 and 11 fixed to the frame, between the positions shown in full lines and in dot-dash lines in FIG. 5. The rod 14 and the wing 8 connected thereto are tilted outwardly and clear the access to the seat, to permit the user to leave his seat or to place himself on the seat. In the course of this movement, the end of the arm 60 carrying the yoke 64 has passed through the pivot plane of the lever 52 (FIG. 4) and the link 56 reaches a position of abutment under the frame tube 2, which determines, owing to the reaction force exerted by the elastic layer, a stable position of the lever 50 in the position in which the wing is turned out.

A slight pressure in the forward direction on the arm 58 of the lever 50 is then sufficient to return the wing 8 of the elastic layer to its normal position. Indeed, as soon as this pressure has caused the arm 60 to pivot rearwardly and brought the pin 62 to the rear of the pivot plane of the lever 52, the system becomes unstable. The lever 50 automatically returns to its normal position and the rod 14 and the wing 8 resume their initial upturned position.

Figure 6:
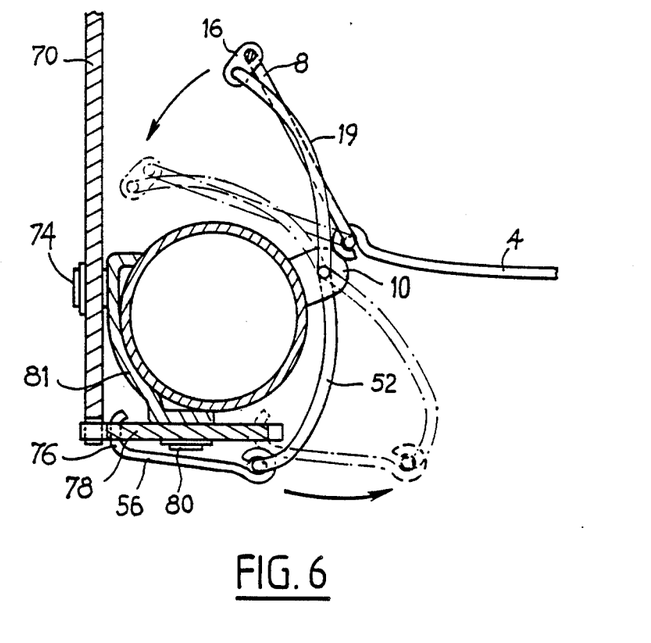
FIG. 6 is a view similar to FIG. 5 of another embodiment.
Figure 7:
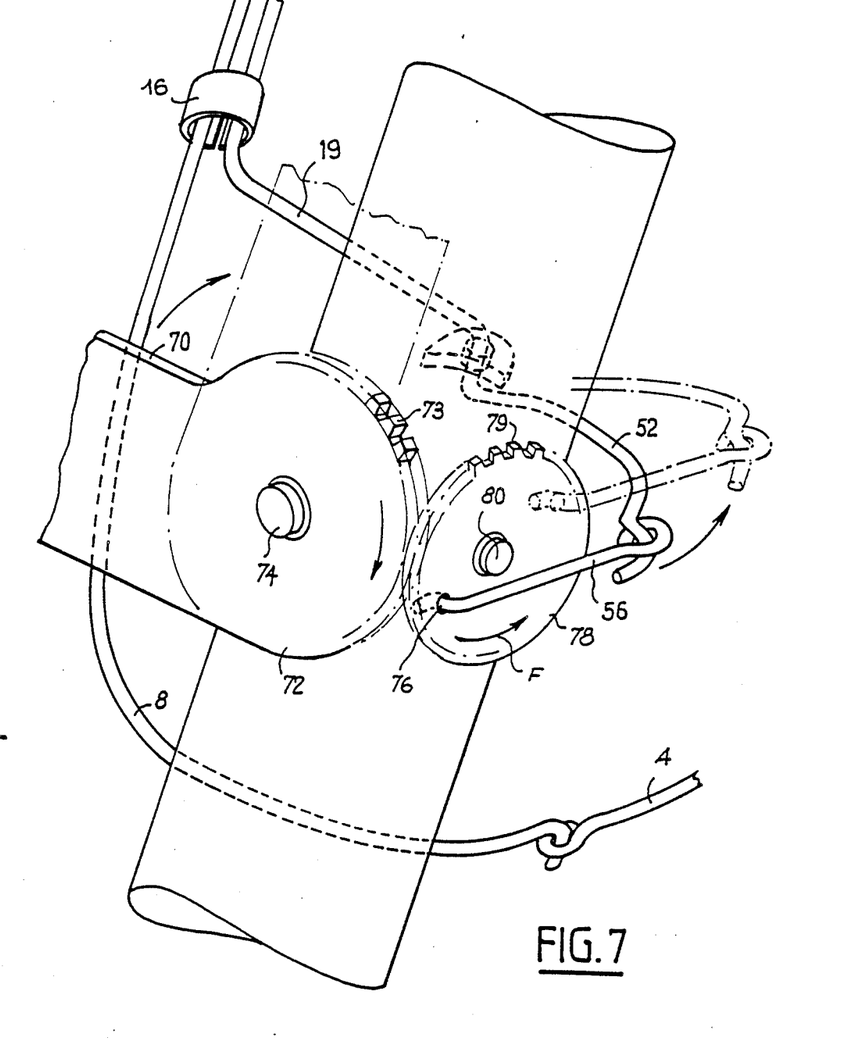
FIG. 7 is a perspective view of the wing turning out device shown in FIG. 6.

The control lever may also have only a single arm 70, as shown in FIGS. 6 and 7, which terminates in a toothed disc 72 centered on the pivot pin 74 mounting the arm on the frame 1. The link 56 is then pivotally mounted at its end 76 remote from the arm 52 on a wheel 78 carrying teeth 79 engaged with the teeth 73 on the disc 72. The link 56 is for example bent into the shape of a hook 76 and extends through the wheel 78 in such manner as to be pivotable relative to the latter while being driven when the wheel 78 rotates. The wheel 78 is rotatively mounted on a pin 80 fixed to the frame 1 substantially in the same plane as the pin 74, the two pins being perpendicular to each other and carried by a bracket 81 rigid with the frame 1.

In the normal position of rest of the shifting arm 70, the end 76 of the link 56 is in the vicinity of the toothed disc 72, as shown in FIGS. 6 and 7, and the lever 52 is close to the frame element. The pivoting of the arm 70 turns the toothed wheel 78 and drives the end of the link 56 in a circular path indicated by the arrow F in FIG. 7. In this movement, the link 56 urges the lever 52 inwardly of the seat and pivots the rod 14 relative to the tabs 10 and 11 from the position shown in full lines to the position shown in dot-dash lines in FIGS. 6 and 7.

With this embodiment, as with the foregoing embodiments, if the wing 8 is in one piece with the frame of the elastic layer, the turning out of the wing causes a swelling of the central part of the layer which offers increased comfort to the accessibility of the seat. The wings of the layer may of course be mounted elements pivoted to the edges of the layer (FIG. 6). Preferably, in this case, a spring (not shown in FIGS. 6 and 7) biases the wing to the turned out position.

These manual control devices may of course if desired be mounted in the front part of the seat and act on an extension 20 of the branch 18 of the rod 14. Likewise, the automatic control devices of the other two embodiments may be easily mounted at the rear of the seat if necessary.

Figure 8:
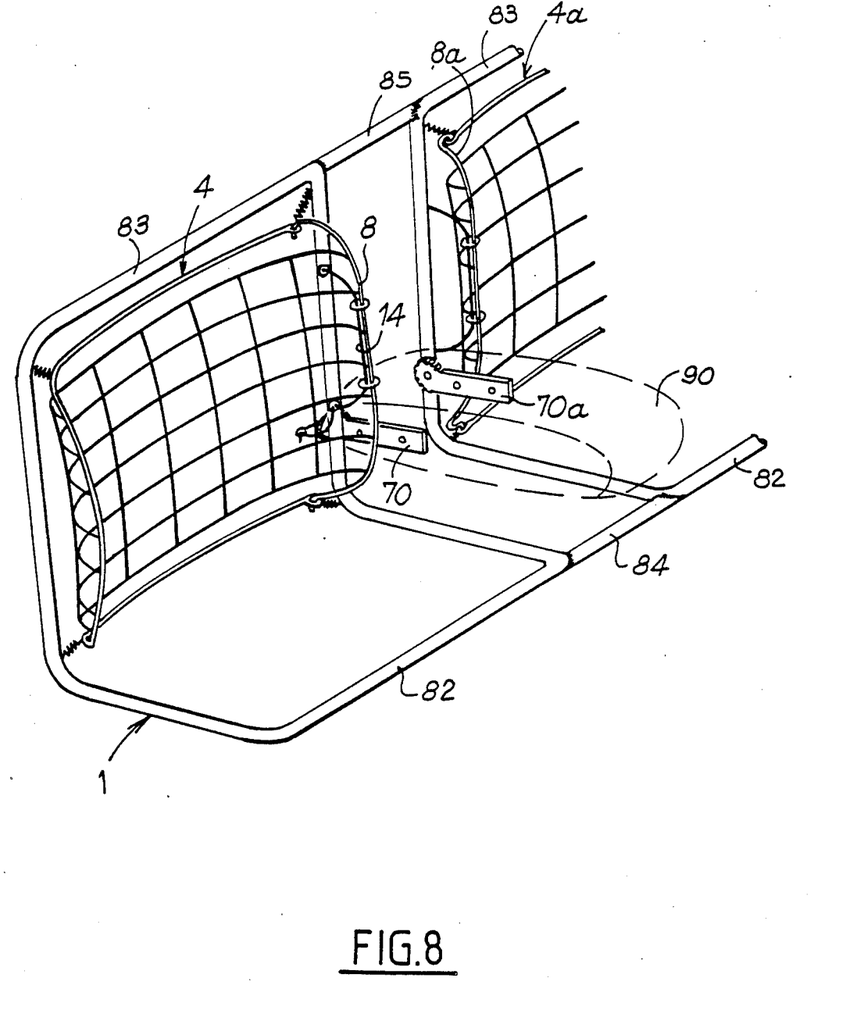
FIG. 8 is a partial perspective view of a double seat provided with wing-turning out devices whereby the double seat can be converted into a bench seat.

It will be easily understood that the wing-turning out device according to the invention may be mounted on a seat cushion or on a backrest. FIG. 8 shows an embodiment of a double seat having two backrest layers each provided with a turning out device.

The seat shown in FIG. 8 comprises a frame 1 forming two side-by-side backrest frames 83 and two seat cushion frames 82 interconnected by braces 84, 85. Each of the backrest frames carries an elastic layer 4, 4a, having lateral wings 8, 8a which project forwardly and a wing-turning out device according to FIGS. 6 and 7 is mounted on each of the adjacent two wings 8, 8a so that their control arms 70, 70a are close to the seat cushion and extend forwardly. The two arms 70 and 70a may then be placed within a movable armrest 90 which, when pivoted upwardly, causes the turning out of the two wings 8 and 8a substantially in the plane of the rest of the layers, which converts the double seat into a bench seat. Movement in the opposite direction of the armrest 90 to the position shown in FIG. 8 turns up the wings 8 and 8a and enables the two side-by-side seats to resume their bucket seat shape.

Irrespective of the type of control device of the invention and the place chosen for mounting it, there is very simply obtained the tilting of the lateral wing of the seat, which permits giving this wing any desired height without resulting in the wing becoming a hindrance as concerns access to the seat. It will be understood that the seat may, if necessary, include means for tilting a wing on both lateral sides of the seat, although usually only one wing needs to be tilted.

What is claimed is:

1. A device for turning out a wing of a bucket seat for an automobile vehicle or the like, said seat comprising a frame and an elastic layer provided with two lateral projecting wings carried by the frame; said device comprising a driving rod which is bent into the shape of an inverted U having a base, connected to an upper part of the wing to be turned out, and two branches having ends pivotally mounted on the frame, and which is extended by a connecting lever, control means connected to the connecting lever and controlling the movement of the wing between a normal projecting position of use of the seat and a laterally turned out position of the wing, and a control cable connected to the connecting lever and to a post of a door of the vehicle.

2. A device according to claim 1, comprising spacedapart fasteners connecting the driving rod to the upper part of the wing.

3. A device according to claim 1, wherein the connecting lever is formed by an extension of the driving rod and is in one piece with the driving rod.

4. A device according to claim 1, wherein the connecting layer is bent around a lateral element of the frame.

5. A device according to claim 1, comprising a screw-threaded rod connected to the connecting lever and a motor-speed reducer unit drivingly connected to the screw-threaded rod, the unit being actuated by the movement of the door of the vehicle.

6. A device according to claim 1, comprising a control lever pivotally mounted on the frame and bent, and an articulated link connecting the control lever to the connecting lever, and extending below said frame.

7. A device according to claim 1, comprising a control lever pivotally mounted on the frame, and a direction-changing means combined with an articulated link connecting the control lever to the connecting lever.

8. A bucket seat for an automobile or the like and comprising a seat cushion frame, an elastic layer carried by the frame and having two lateral projecting wings, and a device for turning out at least one of said wings, said device comprising a driving rod which is bent into the shape of an inverted U having a base, connected to an upper part of the wing to be turned out, and two branches having ends pivotally mounted on the frame, and which is extended by a connecting lever, control means connected to the connecting lever and controlling the movement of the wing between a normal projecting position of use of the seat and a laterally turned out position of the wing, and a control cable connected to the connecting lever and to a post of a door of the vehicle.

9. A device according to claim 1, wherein said control means temporarily deforms said elastic layer when controlling said movement of said wing to said laterally turned-out position of said wing.

10. A bucket seat according to claim 8, wherein said control means temporarily deforms said elastic layer when controlling said movement of said wing to said laterally turned-out position of said wing.

11. A bucket seat according to claim 8, wherein each of said control lever means temporarily deforms its corresponding said each elastic layer when controlling said movement of the corresponding said adjacent wing to said laterally turned-out position of said adjacent wing.

12. A double bucket seat for an automobile vehicle or the like, comprising, in combination, on a common general frame:
   two side-by-side backrest frames;
   two backrest elastic layers respectively carried by said two backrest frames;
   each elastic layer having two lateral projecting wings;
   two devices, respectively mounted on two adjacent wings of said two elastic layers, for turning out the adjacent wings;
   each of said two devices comprising a driving rod which is bent into the shape of an inverted U having a base, connected to an upper part of the corresponding adjacent wing to be turned out, and two branches having ends pivotally mounted on the corresponding backrest frame, each said driving rod being extended by a corresponding connecting lever;
   two control lever means, each connected to a different said connecting lever, for controlling the movement of each of said two adjacent wings between a normal projecting position of use of the seat and a laterally turned-out position of the wing;
   the respective control lever means being substantially parallel to each other and located in the vicinity of a seat cushion of the seat; and
   a pivotal arm rest located between said two backrest layers and enclosing both of said control lever means so that a raising of the arm rest causes the turning out of the two adjacent wings and converts the double seat into a bench seat.

* * * * *